United States Patent
Aad et al.

(10) Patent No.: US 8,085,807 B2
(45) Date of Patent: Dec. 27, 2011

(54) METHOD AND APPARATUS FOR REAL TIME SCHEDULING OF TRAFFIC IN WIRELESS NETWORKS

(75) Inventors: Imad Aad, Munich (DE); Luis Loyola, Munich (DE); Philipp Hofmann, Munich (DE); Jörg Widmer, Munich (DE)

(73) Assignee: NTT DoCoMo, Inc., Tokyo (JP)

(*) Notice: Subject to any disclaimer, the term of this patent is extended or adjusted under 35 U.S.C. 154(b) by 896 days.

(21) Appl. No.: 12/077,989

(22) Filed: Mar. 24, 2008

(65) Prior Publication Data
US 2008/0232285 A1    Sep. 25, 2008

(30) Foreign Application Priority Data
Mar. 23, 2007  (EP) .................................... 07104830

(51) Int. Cl.
H04L 12/43 (2006.01)
(52) U.S. Cl. ........................................ 370/459; 370/461
(58) Field of Classification Search .................. 370/329, 370/459, 461
See application file for complete search history.

(56) References Cited

U.S. PATENT DOCUMENTS

| | | | |
|---|---|---|---|
| 2005/0135408 A1 | 6/2005 | Han et al. | |
| 2005/0201340 A1 | 9/2005 | Wang et al. | |
| 2006/0153148 A1* | 7/2006 | Bichot et al. | 370/338 |
| 2006/0187952 A1* | 8/2006 | Kappes et al. | 370/445 |
| 2006/0268786 A1* | 11/2006 | Das et al. | 370/335 |
| 2009/0268752 A1* | 10/2009 | Miyazaki et al. | 370/458 |

FOREIGN PATENT DOCUMENTS

| | | | |
|---|---|---|---|
| EP | 1 662 709 A1 | 5/2006 | |
| KR | 1 662 709 A1 * | 5/2006 | |

OTHER PUBLICATIONS

European Search Report for the corresponding European application No. 07104830.0-1249 dated Sep. 20, 2007.
"IEEE Standart Part 11: Wireless LAN Medium Access Control (MAC) and Physical Layer (PHY) Specification. (ISO/IEC 8802-11, ANSI/IEEE Std 802.11-1999) Chapter 9: MAC Sublayer Functional Description," Aug. 20, 1999, pp. 70-97.

* cited by examiner

Primary Examiner — Kevin C Harper
Assistant Examiner — Sai-Ming Chan
(74) Attorney, Agent, or Firm — Nutter McClennen & Fish LLP; John J. Penny, Jr.; Christina M. Sperry

(57) ABSTRACT

Apparatuses, realtime-stations, computer programs, and methods for scheduling of traffic in wireless networks are provided. In one embodiment, a method is provided for scheduling of traffic in a wireless networks including real-time stations intending to send real-time traffic and best-effort stations sending best effort traffic. The method can include overhearing for a predetermined period of time the traffic by a station which intends to send real-time traffic, and if from the overhearing the station concludes that there is already a primary station transmitting real-time access markers, assuming by the station a sequence number based on the number of real-time stations which already are sending real-time traffic.

16 Claims, 8 Drawing Sheets

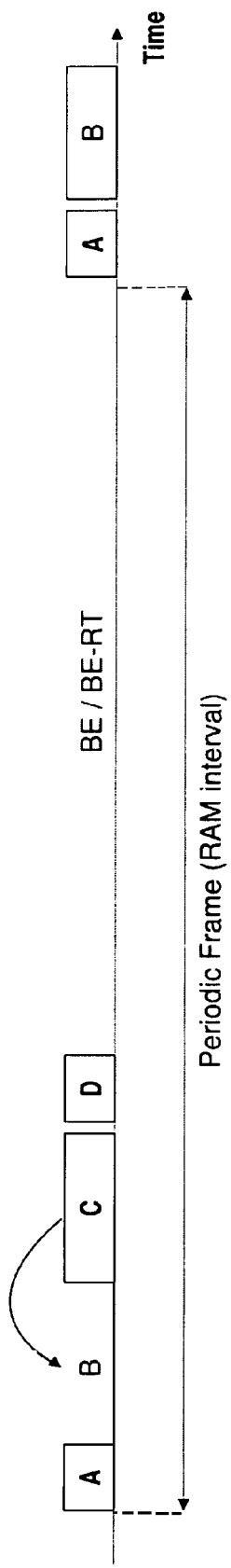
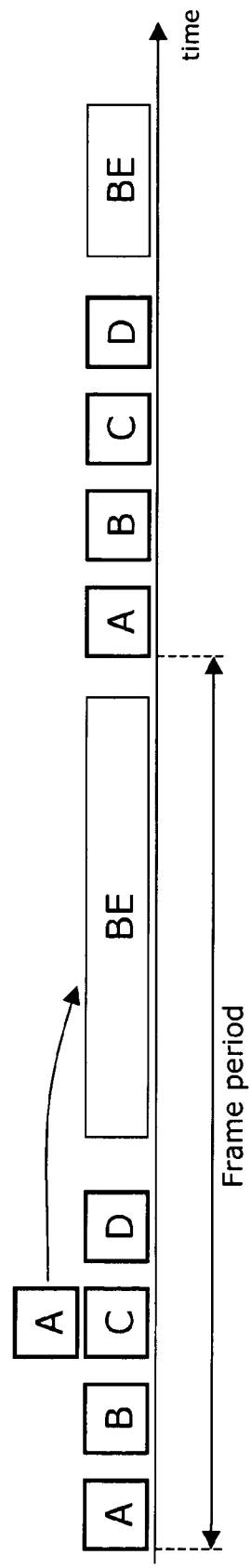
Fig. 2
Fig. 3

METHOD AND APPARATUS FOR REAL TIME SCHEDULING OF TRAFFIC IN WIRELESS NETWORKS

FIELD OF INVENTION

The present invention relates to a method and an apparatus for real-time traffic scheduling in wireless networks.

BACKGROUND OF THE INVENTION

Wireless networks have become widely distributed nowadays. A widely used type of networks referred to as "wireless LANs" is defined in the IEEE 802.11 standards of which there exists a whole family. One issue in such type of wireless networks is the problem of quality of service. Traditionally the nodes of such kind of networks transmit in the so-called "best effort" mode which means that a sender can transmit at a rate which is currently available at the network. The "best effort" mode does not ensure a certain quality of service (also referred to as QoS) like a minimum assured bandwidth which could enable "real-time" transmission.

However, there have been efforts to implement QoS or real-time transmission in wireless networks. The most relevant known solutions are IEEE 802.11e (see IEEE standard for information technology—specific requirements part 11: Wireless LAN medium access control (MAC) and physical layer (PHY) specifications: Amendment 8: Medium access control (MAC) quality of service enhancements. IEEE Standard 802.11E-2005, 2005) and the Contention-Free Access using the point coordination function (PCF) defined in the IEEE 802.11 standard (see IEEE standard for information technology—LAN/MAN—specific requirements—part 11: Wireless LAN medium access control (MAC) and physical layer (PHY) specifications. IEEE Standard 802.11, 1999/8802-11 (ISO/IEC8802-11:1999), 1999).

In the former, even though different priorities can be assigned to different traffic flows, it still lacks *strict* quality guarantees since the mechanism is contention-based. While real-time packets get assigned higher priority and based thereon have a higher likelihood of getting assigned a short backoff time, still there is the problem that the mechanism is contention based, and if the total number of packets/stations is too high, there is only a statistical chance that the real-time packet is transmitted with the desired quality and there is no strict quality assurance.

On the other hand, the PCF mode in 802.11 can offer strict guarantees. However, mainly due to their complexity, very few implementations can be found in the market. Apart from the drawback of implementation complexity, strict guarantees rely on "medium reservations" that are usually done on a periodic basis, e.g. a given station reserves the channel for transmitting (P bytes) every T seconds. However, this periodicity does not match the real-time traffic pattern from the data sources. Consider for example voice traffic, where the communication channel is typically idle for ⅔ of the time. Several voice codecs tend to optimize the bandwidth use by applying silence suppression functionality, leaving several (periodic) reserved RT slots empty.

One may try to adapt the period of time slot reservation to the voice codec pattern to optimize bandwidth efficiency, or to reduce delays, but never both at one time.

To support Real-time traffic in wireless networks the "traditional" approach is to make periodic time slot reservations at the MAC layer. This is schematically illustrated in FIG. 1A. FIG. 1A shows below the reserved timings for real-time packet transmission indicated as dashs on the time axis, and in the upper part there is shown the packet arrival frequency through dashed boxes, whereas the solid line boxes represent arriving real-time packets. One can see that in case of FIG. 1 there is no significant delay in the transmission of real-time packets, however, the period between two consecutive real-time (RT) time slots is relatively small which increases the likelihood of unused RT time slots, thereby decreasing efficiency.

To increase efficiency one may increase this time period as shown in FIG. 1B. One can see that depending on the arrival time there can be a significant delay in the forwarding of real-time packets, such as in case of the of the fourth real-time packet shown in FIG. 1B which arrives only shortly after the third reserved RT slot and which therefore has to wait for some time until it is sent at the fourth reserved RT slot.

One possibility to decrease the delay would be to decrease the period between two RT slots reserved for real-time transmission as in the example of FIG. 1A, but as previously mentioned this decreases the reservation efficiency because for a given number of real-time packets there will be a higher number of unused RT slots.

Therefore there is a trade-off between short delays and high efficiency with the approach of RT slots granted to particular users and periodically distributed along the time like in time division multiple access (TDMA) systems.

Hence there is a need for an improved mechanism ensuring real-time traffic in wireless networks. Preferably the mechanism should enable strict guarantees to real-time traffic flows while being backward compatible (deployable in existing 802.11 hotspots), and preferably without starving 802.11 flows.

SUMMARY OF THE INVENTION

According to one embodiment there is provided method for scheduling of traffic in wireless networks, whereas said network comprises real-time stations intending to send real-time traffic and best-effort stations sending best effort traffic, said method comprising: transmitting by a primary real-time station periodically a real-time access marker to thereby define rounds;

assigning a sequence number to each station in said network which intends to send real-time traffic;

based on the sequence number assigned to a station, defining a fixed backoff time at which a packet from this station is transmitted after the start of a round to thereby establish a sequence in which the real-time packets are sent by the different realtime stations, said method being characterized by further comprising:

overhearing for a predetermined period of time the traffic by a station which intends to send real-time traffic;

if from said overhearing said station concludes that there is already a primary station transmitting real-time access markers, assuming by said station a sequence number based on the number of real-time stations which already are sending real-time traffic The definition of rounds and the assignment of fixed backoffs allows a scheduling ensuring real-time transmission. Moreover, by overhearing the traffic by a station which intends to send realtime traffic and assuming a sequence number based on the number of stations which send already realtime traffic, the scheduling of the realtime traffic can be performed in a self-organized manner. Without centrally administrating the transmission sequence a schedule is established by the stations of the network itself, without interference or instructions from an administrator. The real-time access markers define rounds, and within the rounds the realtime transmission of the different realtime stations is scheduled in accordance with their sequence numbers. Such a "self-organizing" scheme for realtime transmission scheduling is applicable in ad-hoc networks where the realtime station acts as a forwarding node and forwards the packets which it has received to the next station, however, it is applicable as well to infrastructure networks (such as 802.11 networks), where the scheme then schedules the transmission from a realtime station to an access point.

Regarding the "overhearing" of the traffic, according to one embodiment the realtime station which intends to send packets could overhear the other transmissions from other realtime stations to guess or determine how many of them are present. This may take some time which is longer than one round, because not every realtime station may transmit in every round. There may be set a fixed time (which may be longer than a round, e.g. several rounds, for example two, three, four or five rounds) for which the overhearing process is performed and then the realtime station guesses the total number of realtime stations and assumes its sequence number accordingly.

Alternatively, according to one embodiment the realtime access marker may include an indication of the number of realtime stations. Then the (new) realtime station which intends to send traffic may assume its sequence number once it has overheard the realtime access marker.

According to one embodiment the method comprises:
if from said overhearing said station concludes that there is not yet a primary station sending real-time access markers, assuming by said station the role of said primary station and starting to send real-time access markers.

In this manner a "primary station" can be determined in case of a network where there is no realtime traffic yet.

According to one embodiment the method comprises:
assigning a maximum number of RT slots per round to each station;
based on the sequence number assigned to a station and the number of RT slots it is allowed to transmit, defining a sequence of fixed backoff times at which packets from this station are transmitted after the start of a round to thereby establish a sequence in which the real-time packets are sent by the different realtime stations.

In this manner the system takes into account different throughput requirements for different RT stations.

According to one embodiment said real-time access marker comprises an indication of the number of stations which currently are sending real-time traffic in said network and the number of reserved RT slots for each of them, and incrementally assigning a new sequence number to a real-time station which newly wants to send real-time traffic based on the number of real-time stations which are already sending real-time traffic.

In this manner the sequence can be established in a distributed manner.

According to one embodiment the method comprises:
overhearing for a predetermined period of time the traffic by a station which intends to send real-time traffic;
if from said overhearing said station concludes that there is already a primary station transmitting real-time access markers, assuming by said station a sequence number based on the number of real-time stations which already are sending real-time traffic;
if from said overhearing said station concludes that there is not yet a primary station sending real-time access markers, assuming by said station the role of said primary station and starting to send real-time access markers.

According to one embodiment the method comprises:
dividing said rounds (time frames) into a part being used for real-time traffic in which real-time packets can be scheduled and a part being reserved for best effort traffic.

According to one embodiment, if a best effort station does not finish its transmission before the end of the round having a duration of T, thereby taking over a fraction $\Delta T$ of the next round, the next real-time access marker is sent with a delay of $\Delta T$ and the next round duration is shortened to $T-\Delta T$.

According to one embodiment, if a packet from a real-time station does not use the RT slot assigned to it based on the sequence number of said station, the succeeding station takes over said RT slot.

According to one embodiment a real-time station uses only a defined number of real-time slots per round and further packets are "downgraded" and transmitted in best effort mode.

According to one embodiment if a downgraded packet can not be transmitted within a given round (during the contention with other best effort packets) it is upgraded again in the next round and transmitted in the reserved RT slot.

According to one embodiment the method comprises:
before a new real-time station starts to send real-time packets, checking whether the sum of the so far reserved time for real-time transmission and the so far reserved time for best effort traffic plus the transmission time necessary for the traffic of the new station does exceed the round duration, and
if it does exceed said duration, sending said traffic from said new station in best effort mode, and
if it does not exceed said duration, allowing said new station to join the other real-time stations as a further real-time station.

According to one embodiment the method comprises:
setting the duration field in the real-time access marker to a duration corresponding to the remaining backoff of the last RT station/packet in the round to avoid that a best effort station takes over a RT slot which has been assigned to a real-time station.

According to one embodiment the method comprises:
setting the duration field in a real-time packet to a duration such that it can be avoided that a best effort packet can capture a RT slot which is reserved for this or its succeeding real-time packet.

According to one embodiment there is provided an apparatus for scheduling of traffic in wireless networks, whereas said network comprises real-time stations intending to send real-time traffic and best-effort stations sending best effort traffic, said apparatus comprising:
a module for transmitting by a primary real-time station periodically a real-time access marker to thereby define rounds;
a module for assigning a sequence number to each station in said network which intends to send real-time traffic;
a module for based on the sequence number assigned to a station, defining a fixed backoff time at which a packet from this station is transmitted after the start of a round to thereby establish a sequence in which the real-time packets are sent by the different realtime stations, said apparatus further comprising:
a module for overhearing for a predetermined period of time the traffic by a station which intends to send real-time traffic;
a module for assuming by said station a sequence number based on the number of real-time stations which already are sending real-time traffic if from said overhearing said station concludes that there is already a primary station transmitting real-time access markers.

In this way there can be implemented an apparatus which performs a scheduling according to an embodiment of the invention.

According to one embodiment there is provided a realtime-station for scheduling of traffic in wireless networks, whereas said network comprises real-time stations intending to send real-time traffic and best-effort stations sending best effort traffic, said realtime-station comprising:
a module for receiving a real-time access marker sent periodically by a primary real-time station to thereby define rounds;
a module for assigning a sequence number to said realtime-station in said network which intends to send real-time traffic;
a module for based on the sequence number assigned to said station, defining a fixed backoff time at which a packet from this station is transmitted after the start of a round to thereby establish a sequence in which the real-time packets are sent by the different realtime stations, said realtime-station further comprising:
a module for overhearing for a predetermined period of time the traffic by a station which intends to send real-time traffic;
a module for assuming by said realtime-station a sequence number based on the number of real-time stations which already are sending real-time traffic if from said overhearing said station concludes that there is already a primary station transmitting real-time access markers.

In this manner there can be implemented a real-time station which schedules its packets according to a scheme of an embodiment of the invention.

According to one embodiment there is provided a computer program comprising computer program code means adapted to perform the steps of a method according to an embodiment of the invention when said program is run on a computer.

DESCRIPTION OF THE DRAWINGS

FIG. 2 schematically illustrates the scheduling according to an embodiment of the invention.

FIG. 3 schematically illustrates the scheduling according to an embodiment of the invention.

DETAILED DESCRIPTION

Figure 1A:
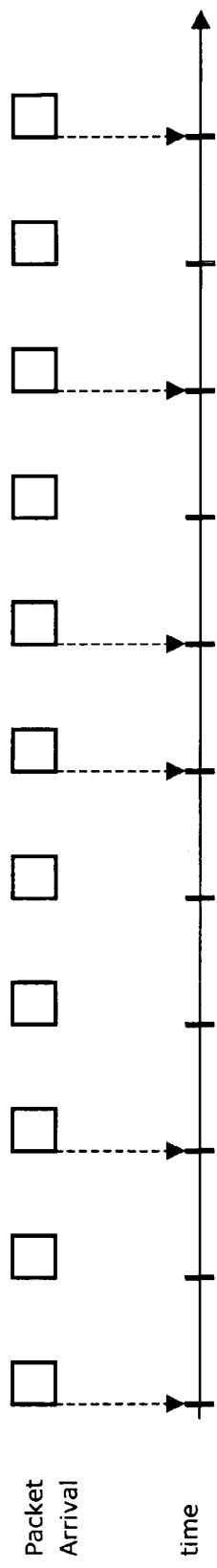
FIG. 1 schematically illustrates the scheduling according to the prior art.

Before in the following embodiments of the invention are described, some terms which will be used in the following description will be clarified.

| | |
|---|---|
| ACK | Acknowledgement |
| BE | Best-Effort (in our context it refers to 802.11 traffic) |
| MAC | Medium Access Control |
| NAV | Network Allocation Vector |
| QoS | Quality of Service |
| RAM | Real-time Access Marker |
| RT | Real-Time |
| SIFS | Short Inter-frame Space |
| AIFS | Arbitrary Inter-frame Space |

According to one embodiment there is a network with n stations among which nrt have real-time (RT) traffic to transmit, using the protocol or mechanism in accordance with an embodiment of the invention, and nbe=n−nrt are legacy 802.11 stations with best-effort (BE) traffic. All n stations are in the same collision domain, contending to access the channel. Without loss of generality, one may consider that all transmit to a common destination, e.g., the access point (AP) of a hotspot. However, one can also use the protocol or mechanism without changes in an ad-hoc, single collision domain network. FIG. 2 illustrates some basic aspects of an embodiment according to the invention.

As can be seen from FIG. 2, there is a periodic round (a time frame with a predefined time length) which is defined by some beacon signal or packet which may be referred to as real-time access marker (hereinafter referred to also as RAM). This RAM is periodically transmitted by some (primary) real-time station and thereby defines some "round" within which packets may be sent. The "round" in some sense may be regarded as a "virtual frame" within which there exists a defined structure. In other words one may say that a "round" is an interval within which realtime transmission follows a certain defined and repeating pattern or sequence.

According to one embodiment there is then established some transmission schedule (which at least to some extent is "fixed") according to which the packets from different real-time stations are sent or forwarded by a certain real-time station. This is indicated in FIG. 2 by the sequence A-B-C-D, i.e. at first there are transmitted packets from station A, then from station B, then C, and then the packets from D. This sequence is fixed with respect to the start of a "round", as can be seen in FIG. 2 from the sequence A-B indicated at the right-hand side in the second round.

According to one embodiment, if a RT slot reserved for a real-time packet is skipped by the station corresponding to this RT slot (e.g. due to silence suppression as indicated for packet B in FIG. 2), the succeeding station(s) (here station C) takes over this RT slot).

According to one embodiment schematically illustrated in FIG. 3 the period between two RAMs (the round) is divided into two parts, one for the real-time transmission and the other one for the best effort traffic.

According to one embodiment, to preserve fairness among RT stations and to protect BE traffic from starvation, a RT station uses only one high priority RT slot in a given interval ("round"). Additional RT packets from that station in the same round get BE (best effort) priority (to contend fairly with BE traffic). Such packets may be denoted as best-effort real-time (BE-RT), one such packet (packet A on top of packet C) is shown in FIG. 3.

The aspects of the embodiments mentioned before may be summarized as follows:
- To get guaranteed access priority, real-time stations establish a transmission schedule/sequence among themselves in a distributed manner.
- To deal with round and schedule synchronization among nodes, without requiring any changes at the AP, a "primary" station transmits periodic reserved access markers (RAM)

To avoid colliding with BE (802.11) stations, real-time stations transmit before any BE (802.11) station grabs the channel by having higher access priority (based on sequence numbers which are based on the number of RT stations which are currently sending).

Figure 1B:
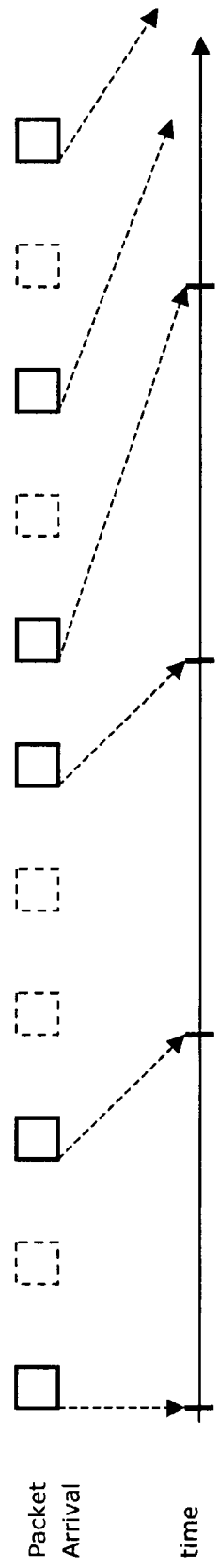

To reuse empty reserved RT slots (e.g., when using voice codecs with silence suppression), when a real-time station skips a reserved transmission RT slot (B in FIG. 1), its successor(s) take over the RT slot, making more space for BE stations.

To protect BE traffic from starvation, a RT station uses only one high priority RT slot in a given interval and additional RT packets from that station in the same round get only BE priority The aforementioned aspects and mechanisms can be implemented while maintaining complete backward compatibility, i.e. there are absolutely no changing requirements on 802.11 stations that coexist with the real-time stations according to embodiments of the invention. The real-time stations may send a "normal" packet which is transparent for BE stations and which in, for instance, the ToS field of 802.11e header identifies it as RT packet. The identification as a RT packet allows the primary station to easily update the list of active RT stations. Moreover, the RAM packet also may be a "normal" 802.11 packet, so that there is no specific handling required which could destroy compatibility.

In the following some further embodiments will be described.

At first the self-organizing setup phase will be explained in somewhat more detail.

Before a real-time station starts transmitting real-time packets, it overhears the channel for a given duration of time. If it does not receive a RAM during this time, it is the first station starting a real-time session. In the following this station will be referred to as the primary station.

The primary station has to broadcast a RAM packet every T to indicate the start of a new round for all RT stations in a synchronous way. The RAM is sent at high priority, e.g., after SIFS (Short Inter Frame Space) and a backoff of one IEEE 802.11 time slot denoted as tslot (SIFS=10 μs and tslot=20 μs for 802.11b) or t_slot. This makes sure that the RAM will always be given the highest priority so that no best effort packet could take over the position of the RAM, thereby guaranteeing that the duration of a round (defined by the time between two RAMs) is constant.

Figure 4:
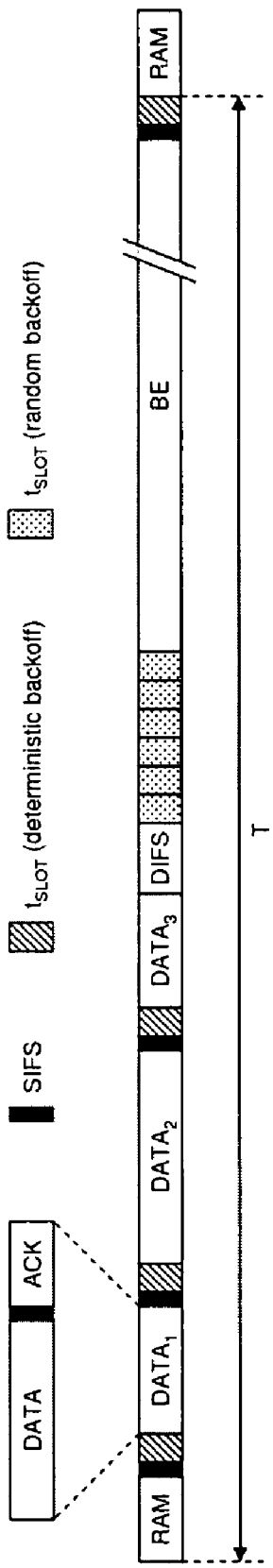
FIG. 4 schematically illustrates the scheduling according to an embodiment of the invention.

The primary station continuously overhears the channel to notice when new real-time stations join. Packets of real-time stations according to one embodiment are identified, for instance, by the IP ToS (type of service) field. Hence, the primary station can maintain a table of all active real-time stations, including their MAC address, and sequence number i (this will be explained in somewhat more detail below), number of packets they are allowed to transmit and the transmission time required for their real-time packets. Additionally, according to one embodiment the time of the last real-time packet transmission of the respective station is stored. It should be noted that preferably other stations should also maintain such a table for the case they become the primary station (such a case will be explained in more detail below). The primary station broadcasts information about the total number of real-time stations nrt, the number of packets each RT station is allowed to transmit and the total time ttot required for transmitting all real-time packets per round through the RAM. If all real-time stations transmit their packets, as schematically illustrated in FIG. 4 the total required transmission time is:

$$ttot=(2nrt+1)SIFS+(nrt+1)tslot+nrt\ tack+tram+SUM\ (tdata,i)$$

The transmission duration of RAM (tram), data packets (tdata,i), and ACK (tack) depends on the current channel rate and thus may vary.

To maintain compatibility with conventional 802.11 devices, according to one embodiment the RAM is a normal 802.11 data frame with specific information in the payload. It is not acknowledged by other stations as it is transmitted in broadcast.

Conventional stations are not aware of the notion of the interval (the "round") and may not finish their packet transmission before the end of a round, thus taking over the next round with a duration ΔT. In this case, the primary station would send the RAM with a delay ΔT and schedule the next RAM after duration T−ΔT (shortening the BE traffic period) to compensate for this delay. Hence, in average the interval T remains constant. This however means that the complete round T can not be used exclusively for real-time transmissions. Therefore, a fraction tguard must be kept unreserved to allow for the variation of the actual length of T, thereby dividing the round effectively into two parts, one where real-time packets may be sent and one which is reserved for best effort transmission. In the worst case, a best-effort station starts sending a data packet shortly before the round ends and tguard should be set appropriately depending on the channel rate, maximum packet size, and T. Another positive side-effect of using tguard is that RT stations do not use the total channel capacity, i.e., BE stations are not starving.

In the following the mechanism for sequence establishment and admission control will be explained in somewhat more detail.

If a real-time station wants to join and is not the primary one, it first has to check whether sufficient transmission time in T is available to accommodate its real-time packets. According to one embodiment, if $$ttot+tguard+2SIFS+tslot+tack+tdata<T,\ whereas$$

ttot=total required transmission time, as defined above
tguard=guard period for preserving best effort traffic
2SIFS=2× short interframe space
tslot=time slot defined in the IEEE 802.11 variant in use (ex. IEEE 802.11a, IEEE 802.11b, IEEE 802.11g)
tack=transmission duration of a MAC acknowledgement
tdata=data transmission time then the real-time station may join. Otherwise, it has to refrain from transmitting real-time packets, contending using BE priority. This is the self-organized admission control which effectively checks whether the so far reserved time (ttot+tguard) plus the necessary time for the transmission of the station which wants to join does not exceed the round duration T.

Now the way how the sequence numbers according to one embodiment are assigned will be described in somewhat more detail. The primary station has sequence number one. A new real-time station joining obtains its own sequence number i (i=1, 2, ...) by simply adding one to the total number of real-time stations nrt previously advertised by the primary station in the RAM. A real-time station with sequence number i selects a non-random backoff time tback, i=(i−1) tslot for its first packet in the queue. The backoff value attached to the other packets in the queue will increment by one until reaching the number of packets the station is allowed to transmit during the RT period. Choosing the backoffs in the described way results in a given transmission sequence, avoiding collisions among real-time stations. However, there is a small probability that two stations join at the same time and hence select the same backoff. This would though result in a collision (detected by absence of an ACK). To resolve this conflict, the two colliding stations wait for a duration r T (r being a random integer number, e.g., between 1 and 10) before trying to join again.

As mentioned before, according to one embodiment each RT station is allowed to reserve a number of RT slots m during the RT period instead of only one (case m=1). In such a case the primary station will announce the sequence number of all RT stations along with the number of reserved RT slots per station. The backoff AIFS_i chosen by a particular station STAi will be applied to its very first packet waiting in the transmission queue. The rest (m−1) packets this STAi is allowed to transmit will obtain incremental backoffs AIFS_i+1, AIFS_i+2, . . . , AIFS_i+(m−1). In this manner it becomes possible to deal with different throughput requirements for different stations by assigning them a different number of reserved RT slots.

In the following reuse and backward compatibility will be explained in somewhat more detail.

Once a real-time station has (sent or) received a RAM, it is allowed to transmit one real-time packet. If a real-time packet is already waiting in the buffer upon receiving the RAM, the real-time station starts decrementing its backoff after the channel gets idle for AIFS (=SIFS+tslot) time. If another real-time station is transmitting, the backoff is frozen until the channel becomes idle again. Hence, if all real-time stations have a packet in their buffer upon receiving the RAM, any two consecutive real-time packets are being transmitted with an idle time of AIFS between them. This case is illustrated in FIG. 4. One can see that the time between subsequent RT packets is SIFS+tslot. The same applies for packets generated by the same RT station.

Figure 5:
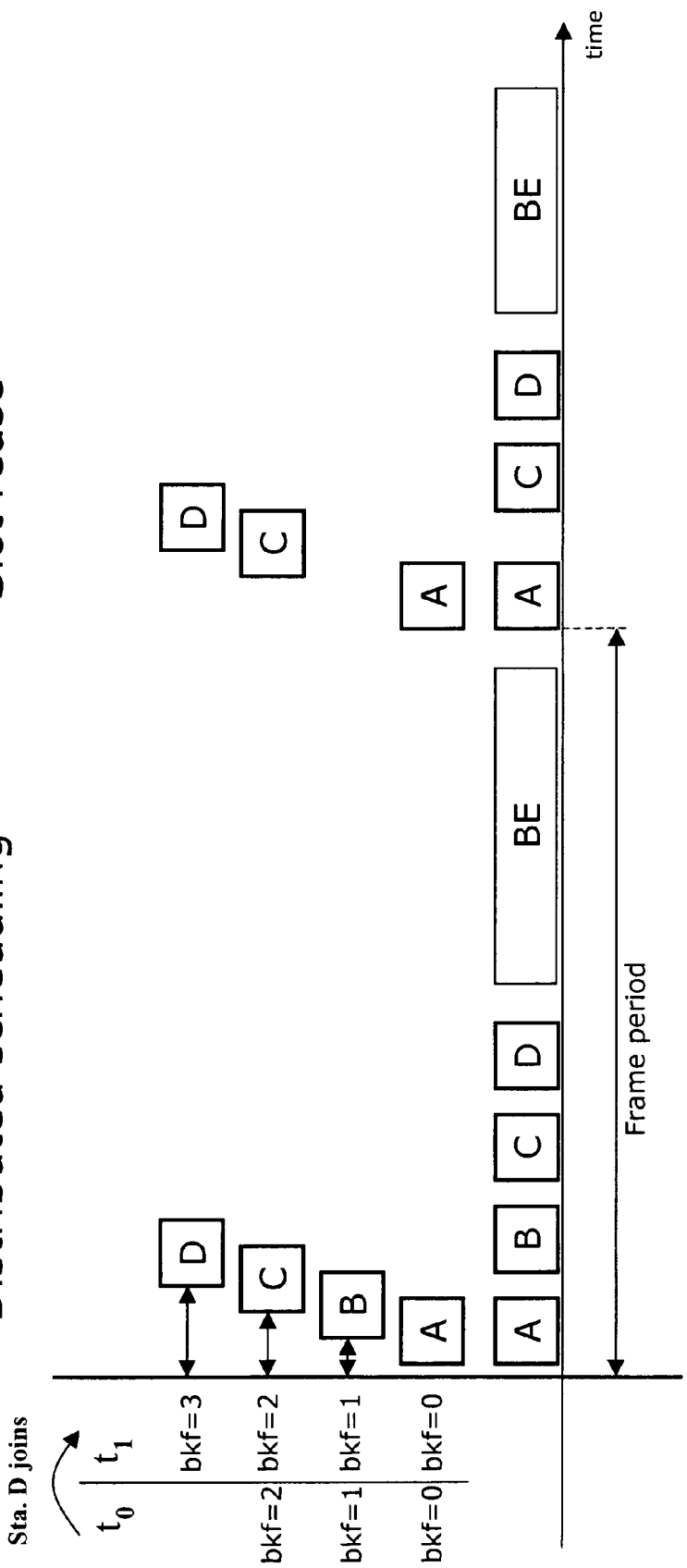
FIG. 5 schematically illustrate the scheduling according to an embodiment of the invention.

FIG. 5 also illustrates the RT slot reuse in case of two packets from station A, and one from stations B to D waiting in the buffer where packet B is skipped. It can be seen that instead packet C takes its place, whereas packet D takes the place reserved for packet C.

In case a real-time station has no packet ready upon receiving the RAM, it skips its turn. The subsequent station in the sequence will then transmit next with an idle time of AIFS+tslot after the previous transmission. This means that the subsequent packet actually takes over the RT slot which was reserved for the previous packet, except for an additional idle time period of SIFS+tslot which must be detected to actually determine that the scheduled packet has been skipped and that the following packet may therefore decrease its backoff to take over its role. Generally, if k consecutive stations with a right to transmit 1 packet/round refrain from transmitting a RT packet after the RAM, the idle time between two packets becomes SIFS+k tslot. In other words, the first packet (the one with the sequence number 1 and originating from the station which joined RT traffic first after the primary station) has a backoff of one corresponding to one tslot, the next packet with the sequence number of 2 (and originating from the station which joined RT traffic second after the primary station) has a backoff of 2 tslots, and so on. Each detected idle slot after a received RAM causes a packet waiting in the buffer to be forwarded to decrease its backoff until it has reached zero so that the packet can be transmitted, thereby reaching a maximum idle time of . AIFS+k tslot.

Figure 6A:
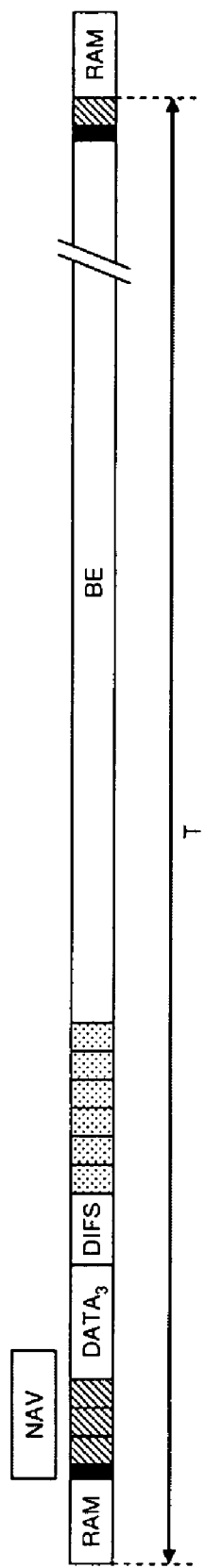
FIGS. 6A and 6B schematically illustrates the scheduling according to an embodiment of the invention.
Figure 6B:
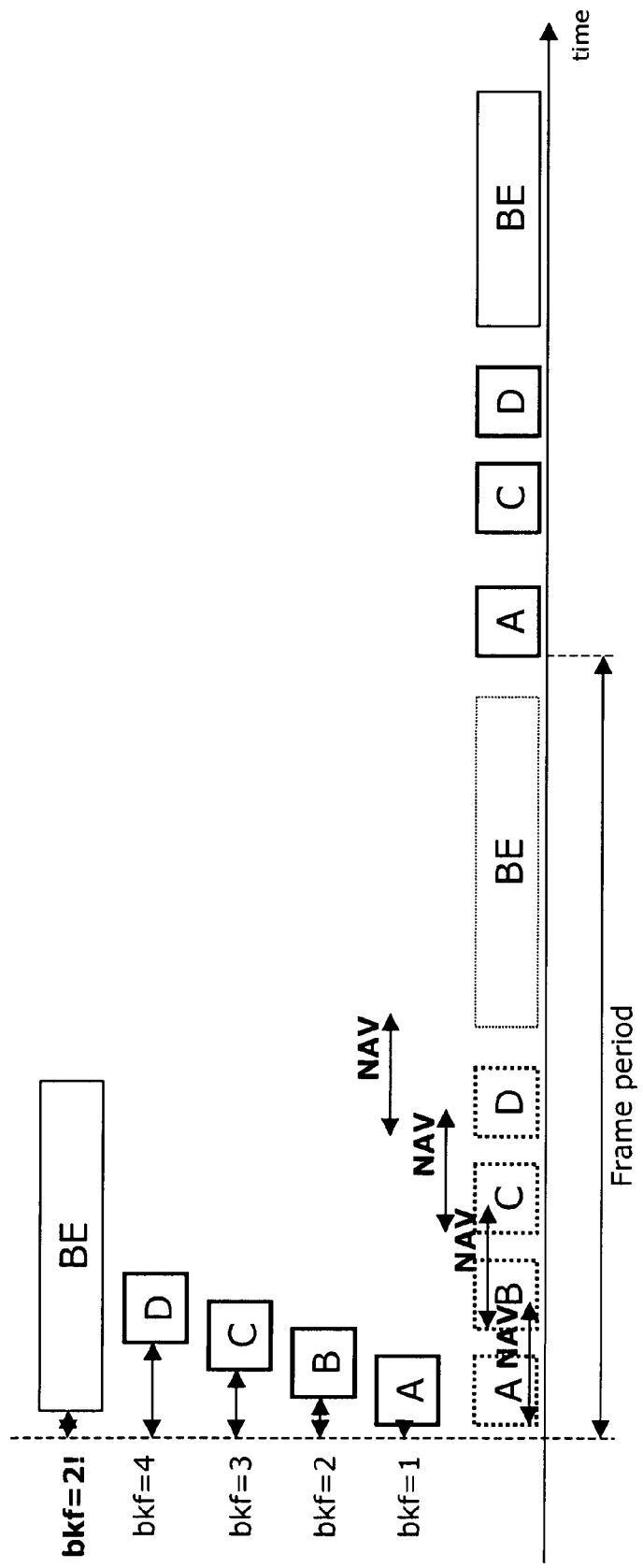

This idle time might be longer than the DIFS (which corresponds to the minimum time between an ACK and a BE packet) of legacy 802.11 stations for large k (or nrt). This means that if the maximum possible idle time is larger than the DIFS this results in possible collisions between RT and BE stations because there is some possibility that a BE station may jump into one of the idle RT slots while a RT packet is still waiting in the buffer. To avoid this, according to an embodiment which is schematically illustrated in FIG. 6A and FIG. 6B, the BE packets which could possibly take over a RT slot are informed that they should wait for a time until it is clear that no real-time packets having a valid sequence number for real-time transmission are still waiting in the buffer. For that purpose, according to one embodiment all real-time stations except the one with the highest sequence number set the duration field (to set the network allocation vector NAV of legacy 802.11 stations) in their packets to 2 SIFS+tack+(nrt−station_index+1) tslot. In this manner, for situations where each RT station has only one RT slot reserved, the duration field in a real-time packet can be set to a duration such that it can be avoided that a best effort packet can capture a RT slot which is reserved for this or its succeeding real-time packet. For cases where stations have more than one RT slot reserved, the formula applies on a per-packet basis and becomes a bit more complicated, namely 2SIFS+tack+tslot*(Total Number of RT Slots Required−(SUM (RT_slots_required_by_STA_i, for =1 to (station_index−1))+number_of_packets_already_ransmitted_by_sta_index in current round)+1). This means that for the RT slots reserved for the station having the index i and all its succeeding stations (having a higher index up to the station with the highest index) it can be prevented in this manner that they are taken over by a BE packet. It should be noted here that tslot is the length of a 802.11 slot which is generally much shorter than a RT slot reserved for a RT packet. In other words, a RT slot is, in general, equivalent to a number of 802.11 time slots (tslots). Moreover it should be noted that the total number of RT slots is given by SUM(REQUIRED_SLOTS BYSTA_i, for i=1 to nrt), whereas nrt is the number of realtime stations. If each RT station has only one RT slot nrt equals the total number of required RT slots. If a RT station requires more than one RT sot, the primary station not only transmits in the RAM the number of RT stations but also the total number of RT slots reserved to enable RT stations to correctly choose their backoff.

Hence, best-effort stations will refrain from transmitting until all real-time stations with buffered packets have transmitted. Also, the duration field needs to be set in the RAM to SIFS+(total number of RT slots+1) tslot. The duration field is ignored by real-time stations. In other words, the duration field in the real-time access marker is set to a duration corresponding to the accumulated backoff time of all real-time stations to avoid that a best effort station takes over a RT slot which has been assigned to a real-time station.

In the following there will be described in more detail how according to one embodiment to preserve BE Traffic and Fairness among RT Stations.

Figure 7:
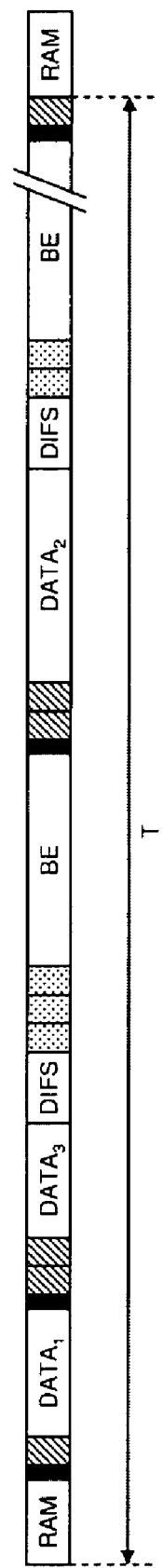
FIG. 7 schematically illustrates the scheduling according to an embodiment of the invention.

Stations may receive real-time packets from the application layer at any time in between two consecutive RAMs (during a "round"). The first m packets (of a given station) in a round are assigned high priority, as described before, e.g. by assigning to them an incremental sequence of backoffs (AIFS_i, AIFS_i+1, AIFS_i+2, . . . ) for the number of packets the station is allowed to transmit during a single RT period, denoted as m. However, if an (m+1)th (of the same station) arrives during the same round, it is either queued until the next RAM or contends in equal conditions as BE (as illustrated in FIG. 7). Such "degraded" packets are referred to as BE-RT packets in the following. Upon hearing a new RAM, a station with a waiting BE-RT packet "promotes" it back to high priority to be transmitted in the RT period. Promoting BE-RT packets has the advantage of:

Avoiding that packets of the same flow get reordered at the MAC layer.

Not delaying RT packets in the queue waiting for a BE-RT packet to get transmitted.

According to one embodiment RT stations are allowed to transmit m RT packets per interval only. Extra RT packets get "degraded" to BE-RT priority to compete equally with 802.11 stations.

By allowing m RT packets to be transmitted by a certain station the problem of different throughput requirements for different stations can be tackled. The mechanism works in such a way that having 3 RT stations transmitting a single RT slot/frame is equivalent (from a systematic viewpoint) to having a single RT station transmitting 3 consecutive RT slots/frame.

It can be simply performed by letting every RT station "reserve" several (m) consecutive RT slots using different consecutive backoffs. This will now be explained by means of a concrete example. For example, let us consider station A which has right to transmit m=3 consecutive packets. For the first packet in the FIFO queue the associated backoff value will be AIFS_A, for the second packet in the queue it will be AIFS_A+1*tslot, for the third one AIFS+2*tslot and so forth. That is, packets of station A will be transmitted with an inter-packet space of AIFS_A in case A uses all its three RT slots.

At the primary station's side, it increases the "number of RT slots" announced in the beacons accordingly, so a new incoming RT station can choose the appropriate new backoff value. The primary station detects the new joining station upon overhearing a RT packet (specified as a new type of packet in the 802.11 header) from a station whose address is not in the list of addresses handled by the primary station. It also detects the value m associated to the new station, by overhearing the number of consecutive RT packets transmitted by the new station. From next beacon, the primary station will start advertising the sequence number and number of RT slots/round to each station (understanding that a RT slot is equivalent to a reserved right to transmit a packet and thus RT slots do not have a fixed time length).

Therefore, "additional/excessive" RT packets from a RT station (to be downgraded) denotes the extent to which packets exceeds m packets/frame instead of 1 packet/frame. For example, if the same station A has an associated value m=3, it will be allowed to transmit a maximum of 3 RT packets in a single frame. In case it has 4 packets at the beginning of a time frame, it will transmit 3 packets during the RT period while the fourth packet will contend for channel access following the conventional 802.11 procedure during the Best Effort period.

In the following the mechanism for releasing a reservation will be described.

If a real-time station has finished its session, the previously reserved resources must be released. If a station has not transmitted a real-time packet for a duration pT (p being a pre-defined integer number valid for all stations, e.g., 100), the primary station supposes that it has finished its real-time session. The primary station then informs the other real-time stations about this fact in the next RAM together with the sequence number of the station that has left. Then, all real-time stations with a higher sequence number can decrement their non-random backoff of their first packet in the queue by one.

If a station has not transmitted a real-time packet for more than pT although it has not finished its real-time session yet, it has to re-join as described above before transmitting the next real-time packet. Alternatively, it might send keep-alive messages (real-time packets without payload) with an interval of (p−1) T during its inactive period.

In case the primary station wants to finish its real-time session, it adds the number of remaining RAMs it will still broadcast to the last j (e.g., 10) RAMs. Thus, other real-time stations know when they have to decrement their sequence number. Furthermore, the real-time station with sequence number two then knows when it has to take over the role of the primary station.

In the following some features of real-time stations and scheduling mechanism in accordance with embodiments of the invention will be summarized. A single round or time frame of length T has been divided into two periods: 1) a guaranteed period for real-time packets, and 2) a conventional 802.11 contention-based period for best-effort traffic, which may also be used by best-effort real-time packets. The time frame structure guarantees that every real-time station i will be able to send at least $m_i$ data packets every T sec. Suppose that a network comprises nrt real-time stations and nbe best-effort stations in a single collision domain with no channel errors so that all of them can overhear each other in perfect conditions unless there is a packet collision, i.e., simultaneous transmissions by two or more stations.

The real-time stations according to one embodiment then share the following properties:

1. During the network initialization phase, every real-time station obtains the number of other real-time stations nrt and number of packets each of them is allowed to transmit from a received RAM or elects itself the primary station (i.e., nrt was zero) before transmitting its first packet. The new real-time station selects a non-random backoff value tback, i=(i−1) tslot according to its sequence number (i=total number of RT slots+1).

If a real-time station has a packet waiting in its buffer upon receiving a RAM, it starts counting down its backoff while the channel is idle after SIFS. Hence, if all RT stations have a packet waiting in their buffer upon receiving the RAM, the idle time between two consecutive RT packets is 1 tslot. Otherwise, if k consecutive stations that are allowed to transmit one packet per round refrain from transmitting a RT packet after the RAM, the idle time between two packets becomes SIFS+k tslot.

2. RT stations ignore the duration field in 802.11 packet header.

3. When a station transmits its first packet in the round, it sets its duration field to 2SIFS+tack+tslot*(1+SUM(i*Number of RT Slots Required_i, from i=my_station_index to i=last station index))t so that legacy 802.11 stations do not reduce their backoff counter during the real-time period. As a result, the duration field is considered only by non-real time stations to set their NAVs.

4. If the allowed m packets have already been transmitted in the current round or time frame and there are one or more packets in the transmission buffer, try to transmit these real-time packets within the best-effort period but only until the next RAM at T. Upon overhearing the new RAM, the next m best-effort real-time packets in the queue are promoted back to real-time class.

One embodiment according to the invention may comprise the following features:

Using fixed backoffs (as timers) for RT slot reuse, giving more 'space' for BE traffic.

Pushing 802.11 stations in time using NAV to allow real-time scheduling for any number of RT stations.

The consecutive selection of backoffs, either by listening to the primary station or overhearing existing RT communications, to allow decentralized scheduling.

Primary station selection

Packet 'degradation' (if excessive) and 'promotion' (if new periodic round starts), not to starve BE traffic.

Figure 8:
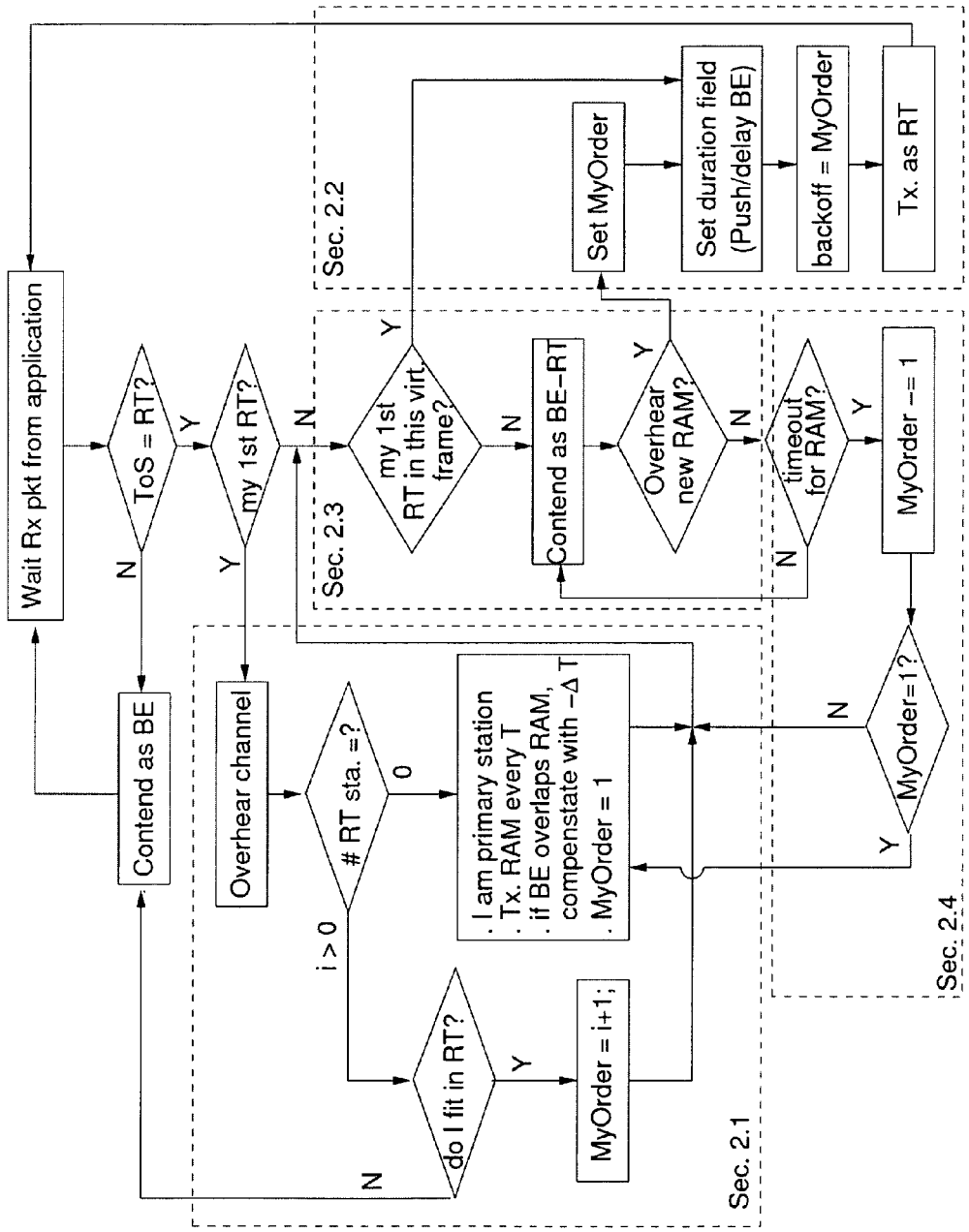
FIG. 8 schematically illustrates a flowchart of the scheduling according to an embodiment of the invention.

FIG. 8 shows a flowchart which illustrates the operation of a mechanism in accordance with an embodiment of the invention. It starts with receiving a packet from an application, if it is not a RT packet it will be forwarded in BE mode.

If there is already a primary station there exists an indication about the number of existing RT stations and the total number of RT slots from the RAM, then the sequence number is chosen accordingly (using an increment of 1) if the admission check results in that there is sufficient time to accommodate a further RT station. Otherwise the packet is forwarded in BE mode.

If the new packet is not the first in the round it contends as BE packet, otherwise the duration field is set to push BE packets and the backoff is chosen in accordance with the order (sequence number and number of previous reserved RT slots).

If the degraded packet could not be transmitted it will be upgraded again and the order will be again set.

If the waiting for RAM leads to a time out the order number is decreased, if it then reaches 1 the station becomes the new primary station.

It will be understood by the skilled person that the embodiments described hereinbefore may be implemented by hardware, by software, or by a combination of software and hardware. The modules and functions described in connection with embodiments of the invention may be as a whole or in part implemented by microprocessors or computers which are suitably programmed such as to act in accordance with the methods explained in connection with embodiments of the invention. An apparatus implementing an embodiment of the invention may e.g. comprise a node or element in a network which is suitably programmed such that it is able to carry out a realtime transmission as described in the embodiments of the invention.

According to an embodiment of the invention there is provided a computer program, either stored in a data carrier or in some other way embodied by some physical means such as a recording medium or a transmission link which when being executed on a computer enables the computer to operate in accordance with the embodiments of the invention described hereinbefore.

Embodiments of the invention may be implemented e.g. by nodes in a network or any entities in a network which are programmed to operate in accordance with the traffic scheduling mechanisms as described before.

The invention claimed is:

1. A method for scheduling of traffic in wireless networks, whereas said network comprises real-time stations intending to send real-time traffic and best-effort stations sending best effort traffic, said method comprising:

transmitting by a primary real-time station periodically a real-time access marker to thereby define rounds and to advertise the total number of real-time stations which are already sending real-time traffic;

obtaining a sequence number by each station in said network which intends to send real-time traffic;

based on the sequence number obtained by a station, defining a fixed backoff time at which a packet from this station is transmitted after the start of a round to thereby establish a sequence in which the real-time packets are sent by the different real-time stations, wherein obtaining the sequence number comprises:

overhearing for a predetermined period of time the traffic by said station which intends to send real-time traffic; and if from said overhearing said station concludes that there is already a primary station transmitting real-time access markers which advertises the total number of real-time stations, obtaining by said station which intends to send real-time traffic its own sequence number based on the number of real-time stations which already are sending real-time traffic by adding one to the total number of real-time stations which has been advertised by said real-time access markers.

2. The method of claim 1, further comprising:
if from said overhearing said station concludes that there is not yet a primary station sending real-time access markers, assuming by said station the role of said primary station and starting to send real-time access markers.

3. The method of claim 1, further comprising:
assigning a maximum number of real-time slots per round to each station;
based on the sequence number assigned to a station and the number of real-time slots it is allowed to transmit, defining a sequence of fixed backoff times at which packets from this station are transmitted after the start of a round to thereby establish a sequence in which the real-time packets are sent by the different realtime stations.

4. The method of claim 1, wherein said real-time access marker comprises an indication of the number of stations which currently are sending real-time traffic in said network and the number of real-time slots each station has reserved, and
incrementally assigning a new sequence number to a real-time station which newly wants to send real-time traffic based on the number of real-time stations which are already sending real-time traffic.

5. The method of claim 1, further comprising:
dividing said rounds into a part being used for real-time traffic in which real-time packets can be scheduled and a part being reserved for best effort traffic.

6. The method of claim 1, wherein
if a best effort station does not finish its transmission before the end of the round having a duration of T, thereby taking over a fraction $\Delta T$ of the next round, the next real-time access marker is sent with a delay of $\Delta T$ and the next round duration is shortened to $T-\Delta T$.

7. The method of claim 1, further comprising:
if a packet from a real-time station does not use the real-time slot assigned to it based on the sequence number of said station, taking over said real-time slot by the succeeding station.

8. The method of claim 1, wherein
a real-time station uses only a defined number of real-time slots per round and further packets are "downgraded" and transmitted in best effort mode.

9. The method of claim 8, whereas if a downgraded packet can not be transmitted within a given round it is upgraded again in the next round.

10. The method of claim 1, further comprising:
before a new real-time station starts to send real-time packets, checking whether the sum of the so far reserved time for real-time transmission and the so far reserved time for best effort traffic plus the transmission time necessary for the traffic of the new station does exceed the round duration, and if it does exceed said duration, sending said traffic from said new station in best effort mode, and if it does not exceed said duration, allowing said new station to join the other real-time stations as a further real-time station.

11. The method of claim 1, further comprising:

setting the duration field in the real-time access marker to a duration corresponding to the remaining backoff of the last RT station/packet in the round to avoid that a best effort station takes over a RT slot which has been assigned to a real-time station.

12. The method of claim 1, further comprising:

setting the duration field in a real-time packet to a duration such that it can be avoided that a best effort packet can capture a RT slot which is reserved for this or its succeeding real-time packet.

13. An apparatus for scheduling of traffic in wireless networks, whereas said network comprises real-time stations intending to send real-time traffic and best-effort stations sending best effort traffic, said apparatus comprising:

a module for transmitting by a primary real-time station periodically a real-time access marker to thereby define rounds and to advertise the total number of real-time stations which are already sending real-time traffic;

a module for obtaining a sequence number by each station in said network which intends to send real-time traffic;

a module for based on the sequence number obtaining by a station, defining a fixed backoff time at which a packet from this station is transmitted after the start of a round to thereby establish a sequence in which the real-time packets are sent by the different realtime stations, wherein said module for obtaining the sequence number comprises:

a module for overhearing for a predetermined period of time the traffic by a station which intends to send real-time traffic; and a module for obtaining by said station a sequence number based on the number of real-time stations which already are sending real-time traffic by adding one to the total number of real-time stations which has been advertised by said real-time access markers if from said overhearing said station concludes that there is already a primary station transmitting real-time access markers which advertise the total number of real-time stations.

14. A realtime-station for scheduling of traffic in wireless networks, whereas said network comprises real-time stations intending to send real-time traffic and best-effort stations sending best effort traffic, said realtime-station comprising:

a module for receiving a real-time access marker sent periodically by a primary real-time station to thereby define rounds and to advertise the total number of real-time stations which are already sending real-time traffic;

a module for obtaining a sequence number by said real-time-station in said network which intends to send real-time traffic;

a module for based on the sequence number obtaining by said station, defining a fixed backoff time at which a packet from this station is transmitted after the start of a round to thereby establish a sequence in which the real-time packets are sent by the different realtime stations, wherein said module for obtaining the sequence number comprises:

a module for overhearing for a predetermined period of time the traffic by a station which intends to send real-time traffic; and a module for obtaining by said realtime-station a sequence number based on the number of real-time stations which already are sending real-time traffic by adding one to the total number of real-time stations which has been advertised by said real-time access markers if from said overhearing said station concludes that there is already a primary station transmitting real-time access markers which advertise the total number of real-time stations.

15. The realtime-station of claim 14, further comprising:

a module for, if from said overhearing said realtime-station concludes that there is not yet a primary station sending real-time access markers, assuming by said realtime-station the role of said primary station and starting to send real-time access markers.

16. A physical computer storage means having a computer program stored thereon that is configured to perform the steps of a method according to claim 1 when said program is run on a computer.

* * * * *